US009455604B2

(12) United States Patent
Rasmussen et al.

(10) Patent No.: US 9,455,604 B2

(45) Date of Patent: Sep. 27, 2016

(54) WOUND-FIELD SYNCHRONOUS MACHINE INCLUDING ROTOR DAMPER-SLEEVE

(71) Applicant: Hamilton Sundstrand Corporation, Windsor Locks, CT (US)

(72) Inventors: Roy D. Rasmussen, Janesville, WI (US); William Louis Wentland, Rockford, IL (US); John F. Bangura, Rockton, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 882 days.

(21) Appl. No.: 13/652,505

(22) Filed: Oct. 16, 2012

(65) Prior Publication Data

US 2014/0103774 A1 Apr. 17, 2014

(51) Int. Cl.

*H02K 3/20* (2006.01)
*H02K 3/46* (2006.01)
*H02K 1/24* (2006.01)

(52) U.S. Cl.

CPC ........................................ *H02K 3/20* (2013.01)

(58) Field of Classification Search

CPC ............. H02K 1/27; H02K 3/24; H02K 5/24

USPC ......................... 310/183, 211, 269, 260, 261

See application file for complete search history.

(56) References Cited

U.S. PATENT DOCUMENTS 2,461,566 A * 2/1949 Morrill ................ H02K 17/165 310/156.76
2,525,456 A * 10/1950 Merrill .......................... 310/211
4,329,603 A 5/1982 Ballard
6,803,671 B1 10/2004 Wobben
6,885,120 B2 4/2005 Kaminski et al.
7,075,204 B2 7/2006 Shiao et al.
7,146,707 B2 12/2006 Tornquist et al.
7,208,854 B1 * 4/2007 Saban et al. .................... 310/61
7,272,514 B2 9/2007 Qi et al.
7,312,419 B2 12/2007 Beeson et al.
7,834,509 B2 11/2010 Legros et al.
2003/0193258 A1 * 10/2003 Reiter et al. ................. 310/216
2005/0077797 A1 4/2005 Bushko et al.
2013/0181568 A1 * 7/2013 Bangura ....................... 310/183

FOREIGN PATENT DOCUMENTS

GB 1110420 A * 4/1968

* cited by examiner

*Primary Examiner* — Jose Gonzalez Quinones

(74) *Attorney, Agent, or Firm* — Carlson, Gaskey & Olds, P.C.

(57) ABSTRACT

A wound-field synchronous machine includes a stator and a rotor. Around the rotor is a rotor sleeve including a damper bar assembly forming an amortisseur circuit.

13 Claims, 3 Drawing Sheets

420 400 422 434 430 432 436

WOUND-FIELD SYNCHRONOUS MACHINE INCLUDING ROTOR DAMPER-SLEEVE

TECHNICAL FIELD

The present disclosure relates generally to wound-field synchronous machines, and more specifically to a wound-field synchronous machine including a rotor sleeve.

BACKGROUND OF THE INVENTION

Aerospace electric power generators, such as those utilized on a commercial aircraft, are typically wound-field synchronous machines, and can deliver highly regulated electrical power over a wide range of operating speeds and loads. Wound-field synchronous machines are required to meet stringent power quality standards that include, but are not limited to, maximum allowable instantaneous voltage distortions induced by non-linear loads, peak-to-peak phase current during electric start with pulse-width modulation inverters to prevent unwanted high peak phase current, and phase over-voltages encountered during load removals. These conditions are particularly exacerbated at high operating speeds and power levels. In order for the wound-field synchronous machine to achieve acceptable instantaneous transient behavior, the wound-field synchronous machine's sub-transient inductance is bounded within an appropriate range that covers the entire operating speed and load conditions of the specific application.

In conventional wound-field design, sub-transient inductance is an important characteristic that is incorporated into the wound-field synchronous machine by embedding a damper cage in the rotor surface. The damper cage includes damper bars that are displaced along, and embedded in, the surface of the rotor poles of the wound-field synchronous machine and brazed on both ends to form an amortisseur circuit. Typically, the damper bars are equally spaced on each pole surface such that the spacing between damper bars is close to the stator tooth pitch, and the total angular span of each amortisseur circuit is strictly limited to the width of the rotor pole body due to the physical form factor of the rotor pole. As a result of the strict limitations on the location of the damper bars, a limited number of damper bars can be placed within the pole body of the rotor. This strict limitation restricts the range, or minimum value, of the sub-transient inductance that can be achieved in the wound-field synchronous machine.

SUMMARY OF THE INVENTION

Disclosed is a rotor assembly for a wound-field synchronous machine including a rotor core having a plurality of poles, a rotor sleeve positioned about an outer diameter of the rotor pole, a plurality of damper bars embedded in the rotor sleeve, wherein the damper bars are connected together to form at least one amortisseur circuit.

Also disclosed is a wound field synchronous machine including a stator assembly including a plurality of stator windings, a rotor assembly including a plurality of rotor poles, and a rotor sleeve positioned about an outer diameter of the rotor assembly, wherein a plurality of damper bars are embedded in the rotor sleeve, and wherein the damper bars are connected together to form at least one amortisseur circuit.

Also disclosed is a method for controlling a sub-transient inductance of a wound-field synchronous machine including the step of providing an amortisseur circuit in a rotor sleeve surrounding a rotor assembly of the wound-field synchronous machine, thereby reducing a sub-transient inductance of the wound-field synchronous machine.

These and other features of the present invention can be best understood from the following specification and drawings, the following of which is a brief description.

DETAILED DESCRIPTION

Figure 1:
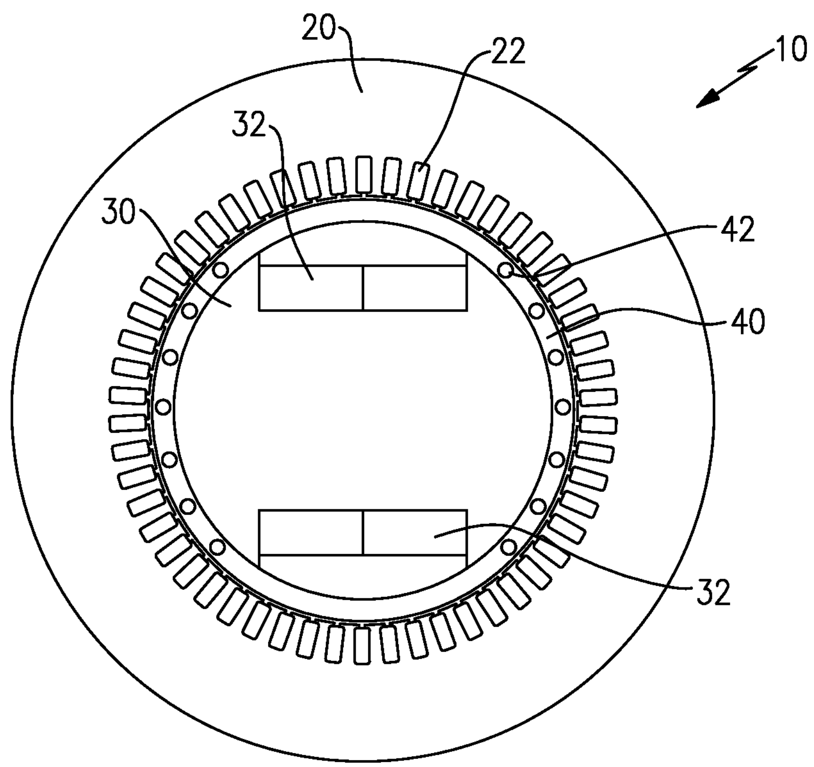
FIG. 1 schematically illustrates a first example two pole wound-field synchronous machine.

FIG. 1 illustrates a wound-field synchronous machine 10 that converts mechanical energy into electrical energy. In one example, the wound-field synchronous machine 10 is an electrical generator for an aircraft. In another example, the wound-field synchronous machine 10 is a starter generator for an aircraft. Although examples and illustrations provided in this disclosure relate generally to generator systems, it is understood that the various features and advantages of this disclosure can apply to any wound-field synchronous machine utilized in any application.

The wound-field synchronous machine 10 includes a stator 20 and a rotor assembly 30. The stator 20 surrounds the rotor assembly 30 and includes multiple stator windings 22. The rotor assembly 30 includes two magnetic poles 32 located 180 degrees apart. The rotor assembly 30 is rotatably positioned within the stator 20, and can include an opening (not pictured) for receiving a shaft as one option or can be installed into a shaft assembly as another option. During generator operation, the shaft turns causing the rotor assembly 30 to rotate. As the magnetic poles 32 of the rotor assembly 30 rotate past the stator windings 22, electrical power is generated within the stator windings 22. When operating as a motor, electrical current is passed through the stator windings 22, and the interaction between the stator windings 22 and the magnetic poles 32 causes the rotor assembly 30 to turn thereby imparting a mechanical rotation onto the shaft.

The illustrated wound-field synchronous machine 10 further includes a rotor sleeve 40 that is positioned around the rotor assembly 30 and between the rotor assembly 30 and the stator assembly 20. The rotor sleeve 40 is connected to, and rotates along with, the rotor assembly 30. Embedded within the rotor sleeve 40 are a plurality of damper bars 42. The damper bars 42 are connected via a conductive ring (not pictured) within the rotor sleeve 40 and form an amortisseur circuit. The amortisseur circuit provides the wound-field synchronous machine 10 with sub-transient inductance characteristics that improve the transient performance of the wound-field synchronous machine 10 via improved sub-transient inductance characteristics.

Embedding the damper bars 42 into the rotor sleeve 40 creates a single integrated damper-sleeve assembly. In contrast, existing designs embed the damper bars on the rotor pole surface and braze the damper bars to copper end plates on both ends of the rotor connecting the separate amortisseur circuits for each rotor pole to create a damper-cage assembly. The rotor sleeve 40 construction enables the rotor sleeve 40 to be fabricated of net shape manufacturing techniques. The rotor sleeve 40 is located on the outer diameter of the rotor assembly 30.

The rotor sleeve 40 construction provides further technical advantages in that the construction provides greater flexibility on the number of damper bars and angular damper bar span that can be used in the amortisseur circuit, and the construction enables a combination of magnetic/paramagnetic and non-magnetic materials to be utilized for fabrication of the rotor sleeve 40. Thus, the rotor sleeve 40 assembly is inherently more flexible than existing wound-field synchronous machines and obtains better sub-transient inductance values bounded within an appropriate range. The improved sub-transient inductance values enable the wound-field synchronous machine 10 to meet more stringent transient power quality requirements over the anticipated operating speeds and load conditions, without negatively impacting steady-state performance of the wound-field synchronous machine 10.

The rotor sleeve 40 can be fabricated from multiple different materials, depending on the requirements of a particular application. For example, in applications that include electric start with pulse-width modulation (PWM) inverters, the rotor sleeve 40 can be fabricated using a magnetic material for the rotor sleeve 40 and copper or paramagnetic material for the damper bars 42. In cases that involve high power and low inductance, peak-to-peak phase currents could be higher than the maximum allowable. To mitigate such peak-to-peak phase currents magnetic or paramagnetic damper bars 42 can be used in place of copper damper bars.

Paramagnetic bars increase the sub-transient inductance without impacting steady-state performance, thereby reducing the peak-to-peak currents during electric start PWM inverter operation. Also, the damper bar resistances of magnetic or paramagnetic damper bars are larger than damper bars made of copper for the same cross section due to a lower conductivity of paramagnetic materials. The transient conditions of magnetic or paramagnetic damper bars decay much faster due to the lower conductivity. This rotor sleeve 40 construction is further applicable in mitigating or reducing peak over-voltages during load removal applications.

In addition to the above described features, the utilization of the rotor sleeve 40 provides greater flexibility on the number of damper bars 42 and non-magnetic materials that can be used, due to the increased area in which the damper bars 42 can be located.

Figure 2:
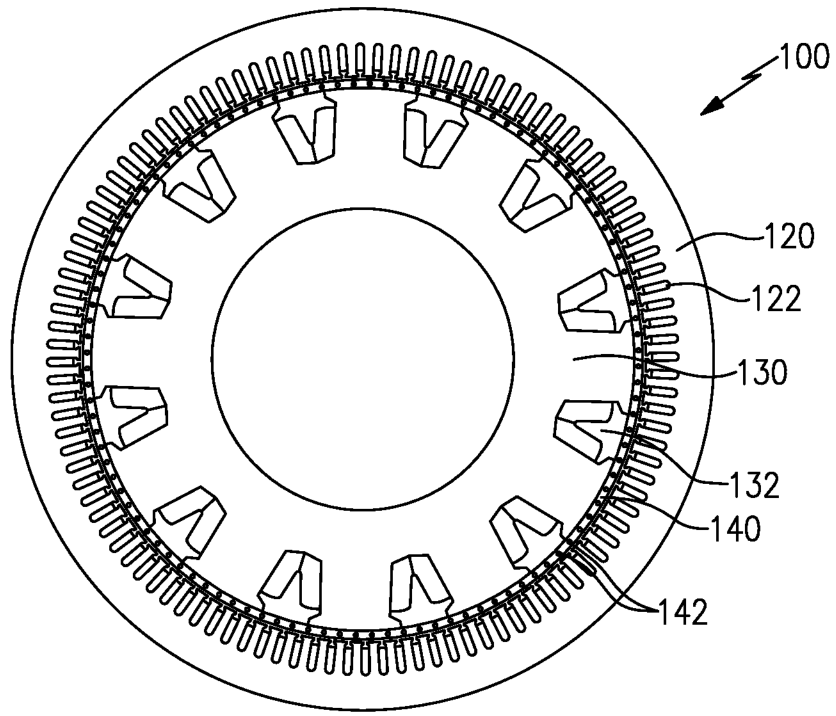
FIG. 2 schematically illustrates an alternate wound-field synchronous machine.

FIG. 2 illustrates an alternate example wound-field synchronous machine 100. The alternate wound-field synchronous machine 100 similarly includes a stator 120 having stator windings 122. The stator 120 surrounds a rotor 130. The rotor 130 includes twelve poles 132. A rotor sleeve 140 is positioned around the rotor 130. Embedded within the rotor sleeve 140 are multiple damper rods 142. The damper bars 142 are distributed evenly about the rotor sleeve 140. As with the example of FIG. 1, the rotor sleeve 140 is constructed of a single material using a net shape fabrication technique.

Figure 3A:
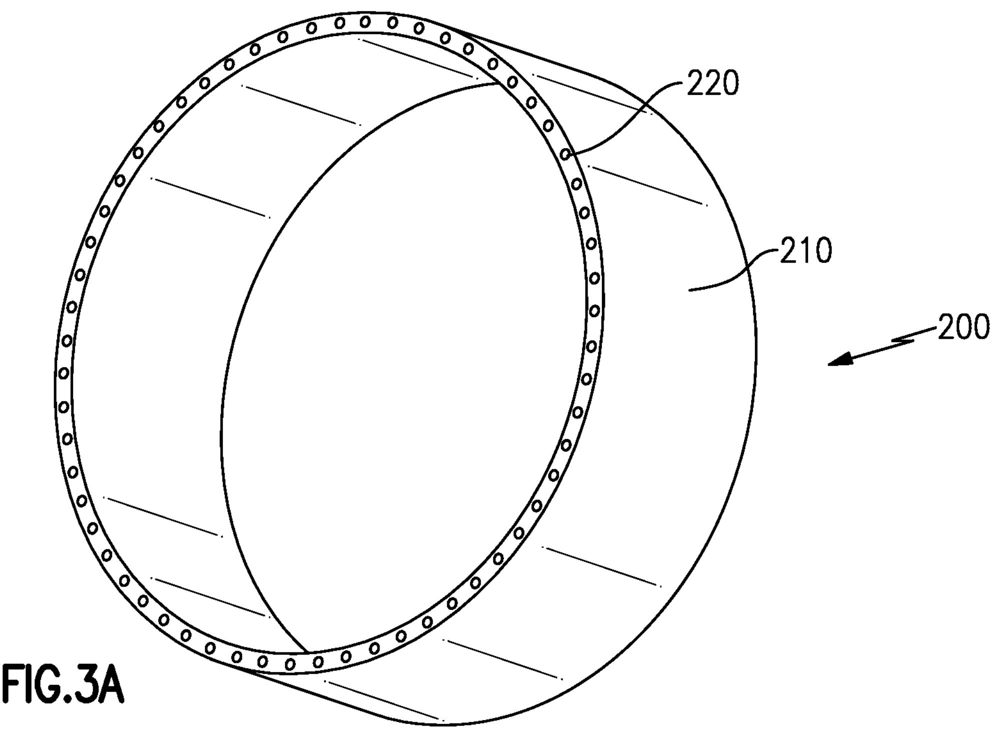
FIG. 3*a* schematically illustrates a rotor sleeve of a wound-field synchronous machine isolated from a corresponding rotor.
Figure 3B:
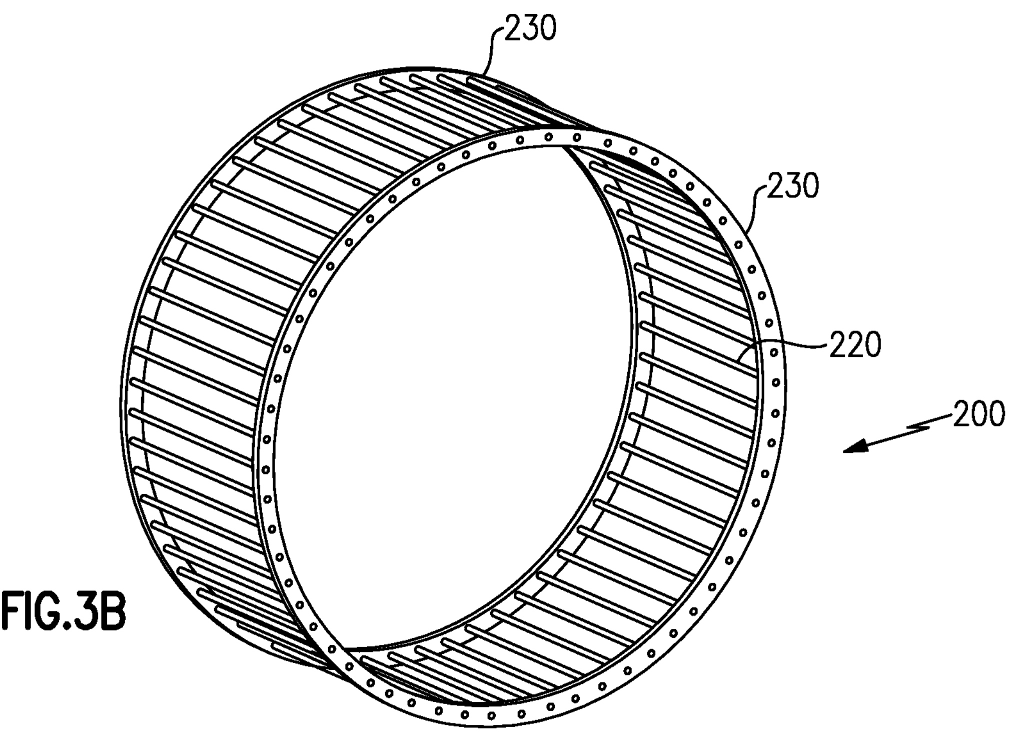
FIG. 3*b* schematically illustrates a wire frame view of the rotor sleeve of FIG. 3*a*.

FIGS. 3A and 3B illustrate a rotor sleeve 200 that can be utilized in a wound-field synchronous machine such as the wound-field synchronous machine 100 of FIG. 2. FIG. 3A depicts an isometric view of the rotor sleeve 200 isolated from a wound-field synchronous machine, and FIG. 3B illustrates a wire-frame view of the same. The body 210 of the rotor sleeve 200 is constructed of a single material and multiple damper bars 220 are embedded within the body 210 of the rotor sleeve 200. Each of the damper bars 220 is axially aligned relative to an axis defined by the rotor sleeve 200. The rotor sleeve 200 includes a conductive ring 230 connecting the ends of each of the damper bars 220, thereby allowing the damper bars to operate as an amortisseur circuit.

The example of FIGS. 3A and 3B is illustrated with multiple damper bars distributed evenly about the rotor sleeve 200. Alternate example rotor sleeves 200 can utilize a varied number of damper bars, such as the rotor sleeve 40 illustrated in FIG. 1, and alternate spacing of the damper bars 220. By way of example, the damper bars 220 can be arranged about the rotor sleeve leaving gaps corresponding to the magnetic poles of the rotor within the rotor sleeve 200. Alternate spacing and alternate numbers of damper bars 220 allows the transient reducing characteristics of the amortisseur circuit created by the damper bars 220 to be tailored for any particular application.

It is further understood that the pitch distance between the damper bars 220 in an assembled or existing wound-field synchronous machine 200, such as the example of FIG. 2, can be varied easily by varying the location of the damper bars 220 within the rotor sleeve without requiring costly modifications to the design of the rotor lamination. In contrast, existing wound-field synchronous machines that utilize a damper-cage amortisseur circuit are limited by the architecture of the rotor poles, and varying the pitch distance of the damper bars 220 requires costly modifications to the design of the rotor lamination.

As can be seen in FIGS. 2, 3A and 3B all of the above described principles can be extended to alternate pole numbers with minimal modifications to the design.

Figure 4:
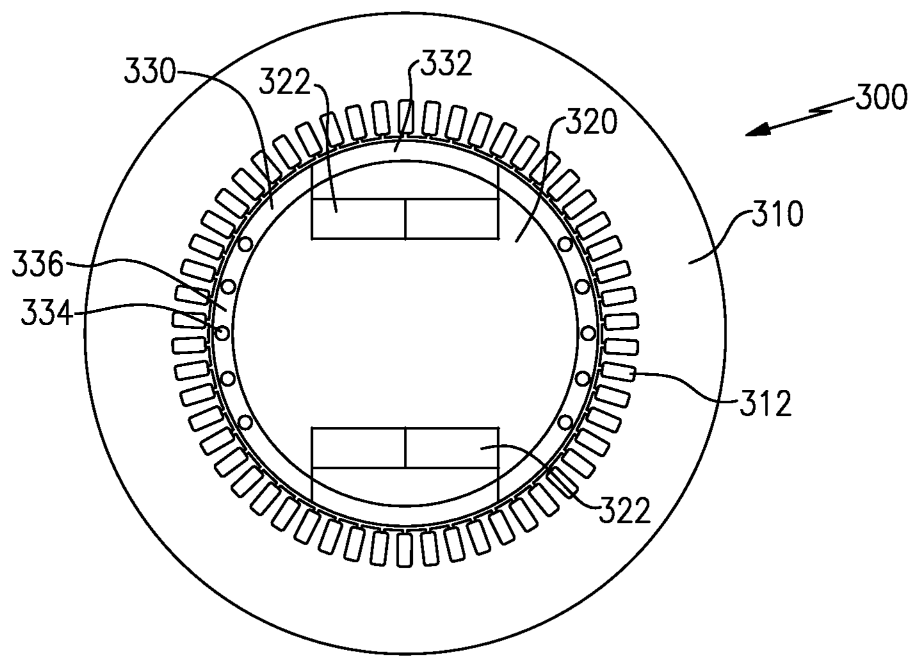
FIG. 4 schematically illustrates a second example two-pole wound-field synchronous machine.

FIG. 4 schematically illustrates a further example wound-field synchronous machine 300 including a rotor sleeve 330. The wound-field synchronous machine 300 includes a stator 310 with stator windings 312, and a rotor 320 with two rotor poles 322. The rotor sleeve 330 is positioned between the stator 310 and the rotor 320 and rotates along with the rotor 320. The rotor sleeve 330 includes four sections, two non-magnetic sections 332 and two magnetic sections 336. The non-magnetic sections 332 of the rotor sleeve 330 are positioned between the rotor poles and the stator windings 312.

This sleeve 330 construction of FIG. 4 uses paramagnetic damper bars 334 instead of copper (or similar material) damper bars 334. The rotor sleeve 330 is suitable for applications that require suppression of over-voltages due to load removal transients and mitigation of peak-to-peak currents during electric start with PWM inverters, among other possible applications. In addition, the two material rotor sleeve 330 does not compromise the steady-state performance of the wound-field synchronous machine because the contribution of the sub-transient inductance to the steady-state energy conversion process is insignificant. For relatively low speeds and low power levels, copper damper bars can be used in the example of FIG. 4 and still meet over-voltage requirements during load removal transients.

Figure 5:
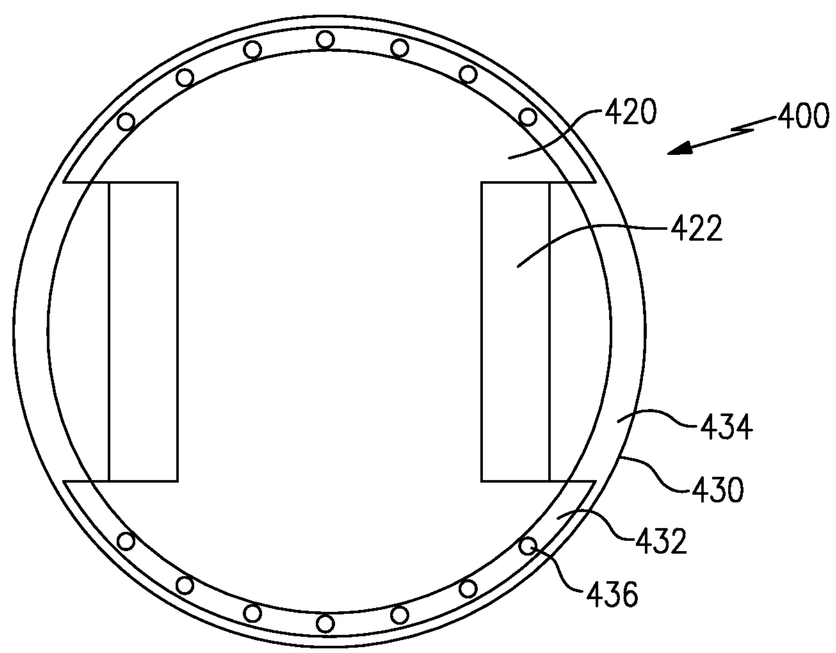
FIG. 5 schematically illustrates an example rotor assembly for a two-pole wound-field synchronous machine.

FIG. 5 illustrates a rotor assembly for an alternate example wound-field synchronous machine including a rotor sleeve 430. The wound-field synchronous machine includes a stator and windings (not pictured) as in the example wound-field synchronous machine of FIG. 4. The stator is positioned around a rotor 420. The rotor 420 has two poles 422. A rotor sleeve 430 is placed around the rotor 420 and is composed of multiple segments 432, 434. Two magnetic or paramagnetic segments 432 are located in the arcs between the two poles 422 and an outer non-magnetic ring 434 surrounds the entire rotor 400 and holds the rotor 400 in place.

The rotor sleeve 430 is fabricated using the net shaping fabrication method with magnetic/paramagnetic material in the inner layer along the pole regions with the damper bars embedded, and a non-magnetic layer in the outer layer and inter-polar regions of the rotor. The damper bars can be non-magnetic copper or paramagnetic/magnetic depending on the applications at hand as described earlier.

It is understood that while each of the examples of FIGS. 4 and 5 are shown in conjunction with a two pole wound-field synchronous machine, and alternate number of poles could be utilized and achieve the same benefits with minor modification to the illustrated examples.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor assembly for a wound-field synchronous machine comprising:

a rotor core having a plurality of poles;

a rotor sleeve positioned about an outer diameter of the rotor pole, the rotor sleeve including at least a first magnetic material and a second non-magnetic material, the arc of said rotor sleeve radially outward of each of said rotor poles is comprised of said second non-magnetic material; and a plurality of damper bars embedded in said rotor sleeve, wherein said damper bars are connected together to form at least one amortisseur circuit, and are circumferentially distributed about said rotor sleeve such that an arc of said rotor sleeve radially outward of each rotor pole is characterized by a lower density of damper bars than a remainder of said rotor sleeve.

2. The rotor assembly of claim 1, wherein each of said damper bars comprises an electrically conductive material.

3. The rotor assembly of claim 1, wherein said first magnetic material is remote from each of said rotor poles, and wherein said second non-magnetic material is a full ring holding said first magnetic material in place, and is adjacent each of said rotor poles.

4. The rotor assembly of claim 1, wherein each of said damper bars is axially aligned relative to said rotor sleeve.

5. The rotor assembly of claim 1, wherein each of said damper bars is a copper damper bar.

6. A rotor assembly for a wound-field synchronous machine comprising:

a rotor core having a plurality of poles;

a rotor sleeve positioned about an outer diameter of the rotor pole; and a plurality of damper bars embedded in said rotor sleeve, wherein said damper bars are connected together to form at least one amortisseur circuit, and are circumferentially distributed about said rotor sleeve such that an arc of said rotor sleeve radially outward of each rotor pole is characterized by a lower density of damper bars than a remainder of said rotor sleeve, wherein each of said damper bars comprises a material selected from a magnetic material and a paramagnetic material.

7. A wound field synchronous machine comprising:

a stator assembly including a plurality of stator windings;

a rotor assembly including a plurality of rotor poles; and a rotor sleeve positioned about an outer diameter of the rotor assembly, the rotor sleeve including at least a first magnetic material and a second non-magnetic material, the arc of said rotor sleeve radially outward of each of said rotor poles is comprised of said second non-magnetic material, wherein a plurality of damper bars are embedded in said rotor sleeve, said damper bars are connected together to form at least one amortisseur circuit, and said damper bars are circumferentially distributed about said rotor sleeve such that an arc of said rotor sleeve radially outward of each rotor pole is characterized by a lower density of damper bars than a remainder of said rotor sleeve.

8. The wound field synchronous machine of claim 7, wherein each of said damper bars comprises an electrically conductive material.

9. The wound field synchronous machine of claim 7, wherein said damper bars are circumferentially distributed about said rotor sleeve such that no damper bars are adjacent said plurality of poles.

10. The wound field synchronous machine of claim 7, wherein said first magnetic material is not adjacent each of said rotor poles, and wherein said second non-magnetic material is a full ring holding said first magnetic material in place, and is adjacent each of said rotor poles.

11. The wound field synchronous machine of claim 7, wherein each of said damper bars is axially aligned relative to said rotor sleeve.

12. A wound field synchronous machine comprising:

a stator assembly including a plurality of stator windings;

a rotor assembly including a plurality of rotor poles; and a rotor sleeve positioned about an outer diameter of the rotor assembly, wherein a plurality of damper bars are embedded in said rotor sleeve, said damper bars are connected together to form at least one amortisseur circuit, and said damper bars are circumferentially distributed about said rotor sleeve such that an arc of said rotor sleeve radially outward of each rotor pole is characterized by a lower density of damper bars than a remainder of said rotor sleeve, wherein each of said damper bars comprises a material selected from a magnetic material and a paramagnetic material.

13. A method for controlling a sub-transient inductance of a wound-field synchronous machine comprising the step of:

providing an amortisseur circuit in a rotor sleeve surrounding a rotor assembly of the wound-field synchronous machine, thereby reducing a sub-transient inductance of the wound-field synchronous machine, the amortisseur circuit including a plurality of damper bars circumferentially distributed about the amortisseur circuit such that an arc of said rotor sleeve radially outward of each rotor pole is characterized by a lower density of damper bars than a remainder of said rotor sleeve; and wherein the rotor sleeve including at least a first magnetic material and a second non-magnetic material, the arc of said rotor sleeve radially outward of each of said rotor poles is comprised of said second non-magnetic material.

* * * * *